United States Patent
Cai et al.

(10) Patent No.: US 12,308,182 B2
(45) Date of Patent: May 20, 2025

(54) CORE PACKAGE, DOUBLE-SUBSTRATE MULTILAYER SOLID ALUMINUM ELECTROLYTIC CAPACITOR AND METHOD FOR PREPARING SAME

(71) Applicant: FUJIAN GUOGUANG XINYE SCI-TEC CO., LTD., Fuzhou (CN)

(72) Inventors: Yong Cai, Fuzhou (CN); Qiaolin Chen, Fuzhou (CN); Jiasheng Xu, Fuzhou (CN); Yuxin Huang, Fuzhou (CN); Hui Chen, Fuzhou (CN)

(73) Assignee: FUJIAN GUOGUANG XINYE SCI-TEC CO., LTD., Fuzhou (CN)

( * ) Notice: Subject to any disclaimer, the term of this patent is extended or adjusted under 35 U.S.C. 154(b) by 0 days.

(21) Appl. No.: 18/913,306

(22) Filed: Oct. 11, 2024

(65) Prior Publication Data
US 2025/0037940 A1    Jan. 30, 2025

Related U.S. Application Data

(63) Continuation of application No. PCT/CN2024/089310, filed on Apr. 23, 2024.

(51) Int. Cl.
| | |
|---|---|
| *H01G 9/048* | (2006.01) |
| *H01G 9/00* | (2006.01) |
| *H01G 9/045* | (2006.01) |
| *H01G 9/10* | (2006.01) |
| *H01G 9/15* | (2006.01) |

(52) U.S. Cl.
CPC ........... *H01G 9/048* (2013.01); *H01G 9/0029* (2013.01); *H01G 9/045* (2013.01); *H01G 9/10* (2013.01); *H01G 9/15* (2013.01)

(58) Field of Classification Search
CPC  H01G 9/15; H01G 9/10; H01G 9/045; H01G 9/0029; H01G 9/048
See application file for complete search history.

(56) References Cited

U.S. PATENT DOCUMENTS

| | | | |
|---|---|---|---|
| 2009/0237868 A1* | 9/2009 | Takahashi | H01G 9/10 |
| | | | 361/540 |
| 2017/0178821 A1* | 6/2017 | Summey | H01G 9/15 |

(Continued)

FOREIGN PATENT DOCUMENTS

| | | |
|---|---|---|
| CN | 107731554 A | 2/2018 |
| CN | 112820546 A | 5/2021 |

(Continued)

*Primary Examiner* — David M Sinclair

(57) ABSTRACT

A core package includes N cores, N+1 hollow-square-shaped thin plates, a first substrate and a second substrate. The N+1 hollow-square-shaped thin plates and the N cores are stacked alternately to form a semi-finished core package. Anode portions of adjacent two cores are electrically connected, and cathode portions of adjacent two cores are electrically connected. When stacking the N+1 hollow-square-shaped thin plates and the N cores, a space where the N+1 hollow-square-shaped thin plates are not in contact with the N cores is filled with an insulating adhesive. A double-substrate multilayer solid aluminum electrolytic capacitor includes a resin shell, a waterproof coating and the core package. This application also provides a method of preparing the double-substrate multilayer solid aluminum electrolytic capacitor.

10 Claims, 8 Drawing Sheets

(56) References Cited

U.S. PATENT DOCUMENTS

2020/0303130 A1\* 9/2020 Furukawa .............. H01G 9/048
2023/0253162 A1\* 8/2023 Chung ................... H01G 9/012
361/540

FOREIGN PATENT DOCUMENTS

| CN | 115274306 | A |   | 11/2022 |
| CN | 115360019 | A |   | 11/2022 |
| CN | 116844870 | A | \* | 10/2023 |
| CN | 116913696 | A |   | 10/2023 |
| WO | 2022116927 | A1 |   | 6/2022 |

\* cited by examiner

CORE PACKAGE, DOUBLE-SUBSTRATE MULTILAYER SOLID ALUMINUM ELECTROLYTIC CAPACITOR AND METHOD FOR PREPARING SAME

CROSS-REFERENCE TO RELATED APPLICATIONS

This application is a continuation of International Patent Application No. PCT/CN2024/089310, filed on Apr. 23, 2024, which claims the benefit of priority from Chinese Patent Application No. 202310880466.4, filed on Jul. 18, 2023. The content of the aforementioned application, including any intervening amendments thereto, is incorporated herein by reference in its entirety.

TECHNICAL FIELD

This application relates to solid aluminum electrolytic capacitors, and more specifically to a core package, a double-substrate multilayer solid aluminum electrolytic capacitor and a method for preparing the same.

BACKGROUND

The rapid development of the electronic information industry has driven the booming of the semiconductor industry. Solid-state aluminum electrolytic capacitors, as the main passive electronic components, have broad application prospects. The multilayer solid aluminum electrolytic capacitor uses conductive polymers as the solid electrolyte, and adopts the structure of multi-layer cores stacked in parallel and surface mount design, which has the advantages of small size, long life, and high environmental protection and safety, and can better match the development needs of the electronic information industry for the miniaturization, thinness and efficiency of the whole machine.

The existing multilayer solid aluminum electrolytic capacitors are generally prepared through the following steps: dividing a formed foil into an anode zone and a cathode zone with a separator; successively forming a conductive polymer solid electrolyte layer, a conductive carbon paste layer, and a silver paste layer on a surface of the cathode zone to form a capacitor core; stacking multiple capacitor cores in parallel, and connecting the stacked capacitor core structure to an external lead frame to lead out the anode and cathode and thus form a core package; encapsulating the core package with epoxy resin and aging; and bending the leads to obtain the multilayer solid aluminum electrolytic capacitor.

The core package prepared by the above process has at least the following deficiencies.

In the prior art, after laying cores on the upper and lower sides of the plane lead frame, a gap exists between the anode tongue and the cathode tongue of the lead frame, and the resin encapsulation material is easy to enter the gap during the packaging process, which will result in extrusion deformation of the cores, causing an increase in leakage current and equivalent series resistance (ESR), and even delamination, insufficient capacitance and capacitor failure. Moreover, the cathode zones of cores are bonded only by conductive silver adhesive, and the resin encapsulation material is easy to invade from the interlayers between the cathode zones of the cores, resulting in leakage current and ESR increase. Based on this, the present disclosure designs a core package, a double-substrate multilayer solid aluminum electrolytic capacitor, and a method for preparing the same to solve the above problems.

SUMMARY

An objective of the present disclosure is to provide a core package, a double-substrate multilayer solid aluminum electrolytic capacitor, and a method for preparing the same to overcome the problem of weak points in the core package that are easy to be invaded by the resin encapsulation material during the encapsulation, such as the gap between the anode tongue and the cathode tongue, and the interlayers between the cathode zones of the cores, which will result in an increase in leakage current and equivalent series resistance (ESR), and even capacitor failure.

Technical solutions of the present disclosure are described below.

In a first aspect, this application provides a core package, comprising:
N cores;
N+1 hollow-square-shaped thin plates;
a first substrate; and
a second substrate;
wherein a cross-sectional area of each of the N+1 hollow-square-shaped thin plates is larger than that of each of the N cores; the N+1 hollow-square-shaped thin plates and the N cores are stacked alternately to form a semi-finished core package; anode portions of adjacent two cores are electrically connected, and cathode portions of adjacent two cores are electrically connected; when stacking the N+1 hollow-square-shaped thin plates and the N cores, a space where the N+1 hollow-square-shaped thin plates are not in contact with the N cores is filled with an insulating adhesive; and
a first end of each of the first substrate and the second substrate is provided with a first leading-out portion, a second end of each of the first substrate and the second substrate opposite to the first end is provided with a second leading-out portion, and the first leading-out portion and the second leading-out portion are symmetrically arranged; the first substrate is bonded to a first side of the semi-finished core package, and the second substrate is bonded to a second side of the semi-finished core package, wherein the first side of the semi-finished core package is opposite to the second side of the semi-finished core package; and the first leading-out portion and the second leading-out portion of the first substrate are respectively electrically connected with an anode portion and a cathode portion of an upper-most core among the N cores, and the first leading-out portion and the second leading-out portion of the second substrate are respectively electrically connected with an anode portion and a cathode portion of a lower-most core among the N cores.

In an embodiment, opposite two ends of each of the N+1 hollow-square-shaped thin plates are respectively an anode plate and a cathode plate, and the anode plate and the cathode plate are connected through two side plates; the anode plate and an anode portion of each of the N cores are each penetrated with a through hole; and when stacking the N+1 hollow-square-shaped thin plates and the N cores, through holes are aligned and communicated with each other, and are filled with a conductive silver paste; and a U-shaped copper foil is provided an outside of the cathode plate, with an opening far away from the anode plate; and when stacking the N+1 hollow-square-shaped thin plates and the N cores, an upper side and a lower side of the U-shaped copper foil are respectively in contact and electrically connected with cathode portions of adjacent two cores.

In an embodiment, one end of the anode plate close to the cathode plate is flush with an end of a separating adhesive of each of the N cores close to the cathode portion of each of the N cores; a length of the anode plate is 100%-120% of a total length of the anode portion and the separating adhesive of each of the N cores, and a width of the anode plate is 120%-150% of a width of each of the N cores;

a length of a portion of the cathode portion of each of the N cores that is sandwiched by cathode plates of adjacent two hollow-square-shaped thin plates is 20%-50% of a length of the cathode portion of each of the N cores; and a width of the cathode plate is 60%-80% of a width of each of the N cores; and a total length of a hollow portion in a middle of each of the N+1 hollow-square-shaped thin plates and the cathode plate is 110%-120% of the length of the cathode portion of each of the N cores; and a width of each of the N+1 hollow-square-shaped thin plates is 120%-150% of the width of each of the N cores.

In an embodiment, each of the first leading-out portion and the second leading-out portion comprises a tongue portion, a connection portion and a pin; the tongue portion and the pin are arranged in parallel respectively on opposite two surfaces of each of the first substrate and the second substrate, and the tongue portion is electrically connected with the semi-finished core package; the connection portion is configured to penetrate through each of the first substrate and the second substrate, and opposite two ends of the connection portion are respectively perpendicularly and electrically connected with the tongue portion and the pin.

In an embodiment, a side of each of the first substrate and the second substrate away from the semi-finished core package is provided with a rectangular protrusion; a length of the rectangular protrusion is 80%-90% of a length of each of the first substrate and the second substrate, and a width of the rectangular protrusion is 80%-90% of a width of each of the first substrate and the second substrate; a height of the rectangular protrusion is 0.3-0.5 mm; the tongue portion is arranged on a side of each of the first substrate and the second substrate without the rectangular protrusion, and one end of the tongue portion is flush with an end of each of the first substrate and the second substrate; and the pin is horizontally arranged on a surface of the rectangular protrusion, and one end of the pin is flush with an end of the rectangular protrusion.

In an embodiment, a distance between edges of two tongue portions close to each other on the same substrate is 40%-70% of the length of each of the first substrate and the second substrate; and a distance between edges of two pins close to each other on the same substrate is 40%-60% of the length of the rectangular protrusion of each of the first substrate and the second substrate.

In a second aspect, this application provides a double-substrate multilayer solid aluminum electrolytic capacitor, comprising:
a resin shell;
a waterproof coating; and
the aforementioned core package;
wherein the waterproof coating is coated on four sides of the core package; the resin shell is configured to wrap the waterproof coating and a part of each of the first substrate and the second substrate of the core package that removes the rectangular protrusion; and four sides of the rectangular protrusion are wrapped inside the resin shell and a surface of the rectangular protrusion provided with the pin is exposed out of the resin shell.

In a third aspect, the present disclosure provides a method for preparing a double-substrate multilayer solid aluminum electrolytic capacitor, comprising:
(S1) alternately stacking N+1 hollow-square-shaped thin plates and N cores from bottom to top in accordance with a designed number of layers, and making a U-shaped copper foil on each of the N+1 hollow-square-shaped thin plates to electrically conduct with cathode portions of adjacent two cores among the N cores to form a first semi-finished core package;
(S2) providing a through hole on an end of the first semi-finished core package near an anode portion of an upper-most core among the N cores to consecutively run through anode plates of the N+1 hollow-square-shaped thin plates and anode portions of the N cores; filling the through hole with a conductive silver paste such that the anode portions of the N cores are electrically conducted with each other, thereby forming a second semi-finished core package;
(S3) bonding a top side of the second semi-finished core package to a first substrate, and bonding a bottom side of the second semi-finished core package to a second substrate, such that a core package is prepared;
(S4) coating a waterproof material on each of four sides of the core package to form a waterproof coating; and
(S5) encapsulating edges of the core package and edges of each of the first substrate and the second substrate with epoxy resin to form a resin shell, such that the double-substrate multilayer solid aluminum electrolytic capacitor is prepared.

In an embodiment, in step (S1), the N+1 hollow-square-shaped thin plates and the N cores are alternately stacked through steps of:
(S11) applying an insulating adhesive to an anode plate on a first side of a first hollow-square-shaped thin plate, and applying a conductive silver adhesive to a U-shaped copper foil on a cathode plate on the first side of the first hollow-square-shaped thin plate;
(S12) bonding a lower surface of a first core to the first hollow-square-shaped thin plate, so that an anode portion of the first core and a separating adhesive of the first core are bonded to the anode plate of the first hollow-square-shaped thin plate, and an end of the anode plate of the first hollow-square-shaped thin plate close to the cathode plate is flush with an end of the separating adhesive close to a cathode portion of the first core; bonding the cathode portion of the first core to the U-shaped copper foil on the cathode plate of the first hollow-square-shaped thin plate, such that the cathode portion of the first core electrically conductive to the U-shaped copper foil; and applying an insulating adhesive to an area of two side plates of the first hollow-square-shaped thin plate that is not covered by the first core;
(S13) applying the insulating adhesive and the conductive silver adhesive to a first side of a second hollow-square-shaped thin plate in the manner of step (S11), and then bonding the first side of the second hollow-square-shaped thin plate to an upper surface of the first core in the manner of step (S12), wherein a width of a region that is clamped by two side plates of adjacent two hollow-square-shaped thin plates in a first end of the cathode portion of the first core is equal to a width of a region that is clamped by two side plates of adjacent two hollow-square-shaped thin plates in a second end opposite to the first end of the cathode portion of the first core to complete the stacking of the first core;

(S14) applying the insulating adhesive and the conductive silver adhesive to a second side of the second hollow-square-shaped thin plate in the manner of step (S11); bonding a lower surface of a second core to the second hollow-square-shaped thin plate in the manner of step (S12); applying the insulating adhesive to an area of two side plates of the second hollow-square-shaped thin plate that is not covered by the second core;

(S15) applying the insulating adhesive and the conductive silver adhesive to a first side of a third hollow-square-shaped thin plate in the manner of step (S11), and bonding the first side of the third hollow-square-shaped thin plate to an upper surface of the second core in the manner of step (S12) to complete the stacking of the second core; and (S16) repeating steps (S14)-(S15) to continuously complete the stacking of $3^{rd}$-$N^{th}$ cores to obtain the first semi-finished core package.

In an embodiment, step (S3) comprises:
making a side of a first substrate provided with a tongue portion opposite to a side of a second substrate provided with a tongue portion, and arranging the second semi-finished core package between the first substrate and the second substrate; and bonding anode plates and U-shaped copper foils of an upper-most hollow-square-shaped thin plate and a lower-most hollow-square-shaped thin plate of the semi-finished core package to the tongue portion through a conductive silver adhesive.

The beneficial effects of the present disclosure are described below.

(1) In the present disclosure, the hollow-square-shaped thin plates and the cores are alternately stacked, and the peripheral size of the hollow-square-shaped thin plate is larger than the size of the core. In this case, after the hollow-square-shaped thin plates and the cores are alternately stacked, the space not occupied by the core is sealed through an insulating adhesive, so as to realize the support and protection of the core, and prevent delamination and the deterioration of the electrical properties caused by entering of resin from the interlayer of the cores during the encapsulation.

(2) Two substrates pre-provided with a leading-out component are used for encapsulation to form a core package, such that the positive pole and the negative pole of the core package can be led out while protecting the upper and lower surfaces of the core package.

BRIEF DESCRIPTION OF THE DRAWINGS

To illustrate the technical solutions of the embodiments of the present disclosure more clearly, the accompanying drawings needed in the description of the embodiments will be introduced briefly below. Obviously, the following accompanying drawings are only some of the embodiments of the present disclosure, and other accompanying drawings can be obtained by one of ordinary skill in the art based on these drawings without making creative effort.

Figure 1:
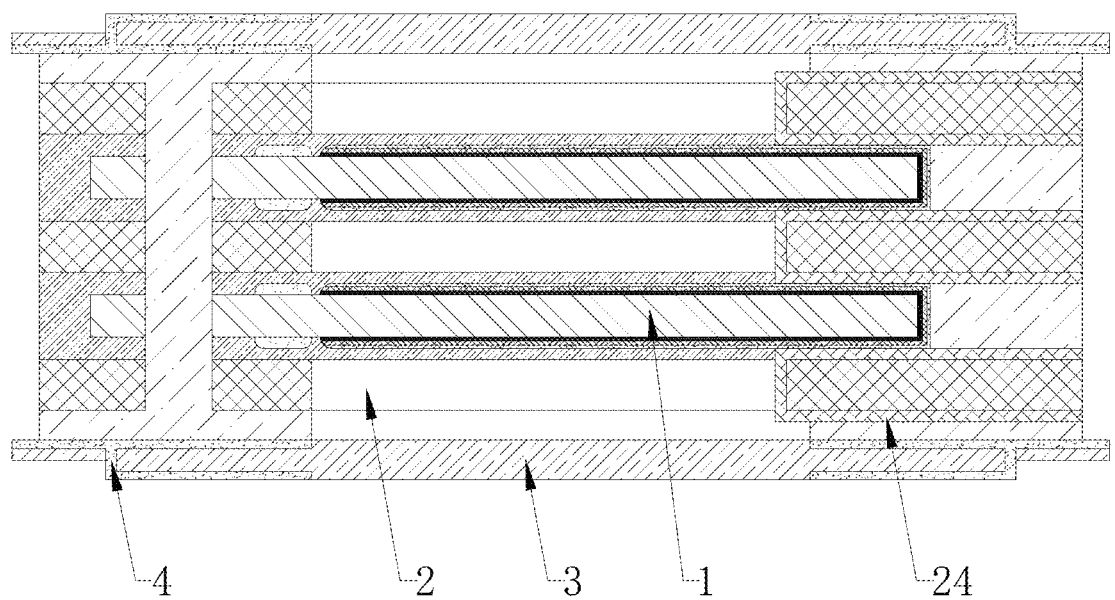
FIG. 1 is a structural diagram of a core package according to an embodiment of the present disclosure.
Figure 2:
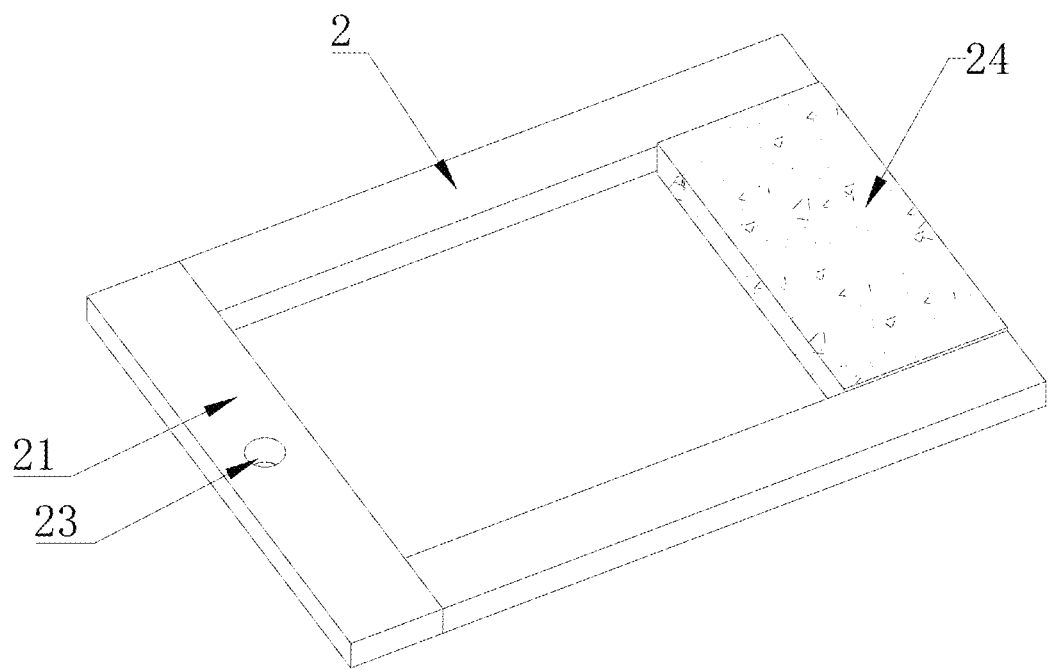
FIG. 2 is a structural diagram of a hollow-square-shaped thin plate according to an embodiment of the present disclosure.
Figure 3:
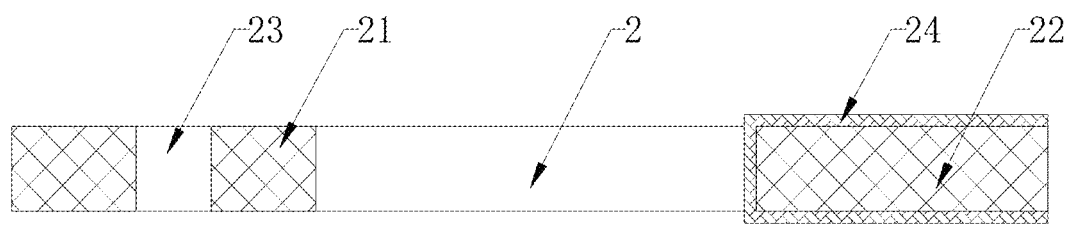
FIG. 3 is a cross-sectional view of the hollow-square-shaped thin plate according to an embodiment of the present disclosure.
Figure 4:
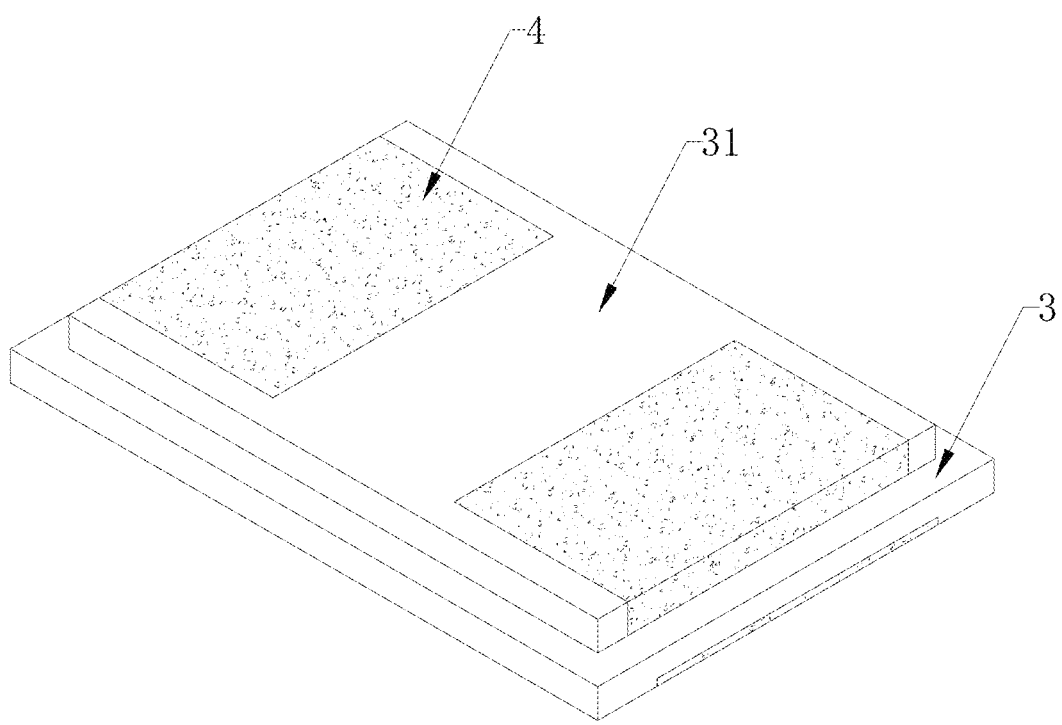
FIG. 4 is a structural diagram of a substrate according to an embodiment of the present disclosure.
Figure 5:
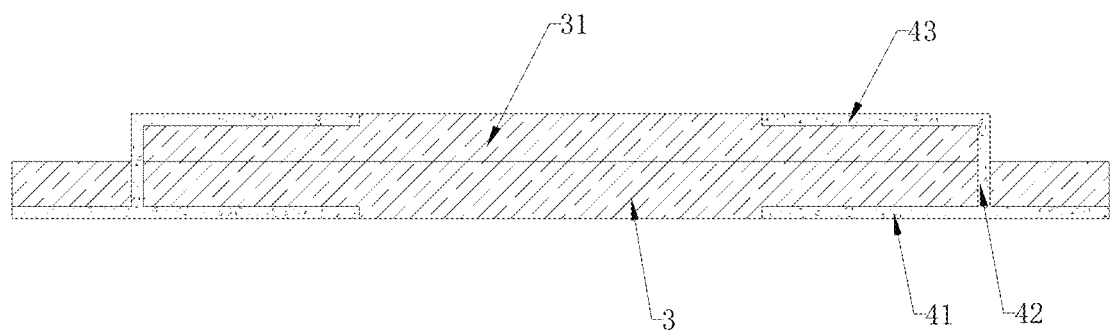
FIG. 5 is a cross-sectional view of the substrate according to an embodiment of the present disclosure.

In the drawings:
1, core; 2, hollow-square-shaped thin plate; 21, anode plate; 22, cathode plate; 23, through hole; 24, U-shaped copper foil; 3, substrate; 31, rectangular protrusion; 4, leading-out portion; 41, tongue portion; 42, connection portion; 43, pin; 5, resin shell; and 6, waterproof coating.

DETAILED DESCRIPTION OF EMBODIMENTS

The technical solutions in the embodiments of the present disclosure will be described clearly and completely with reference to the accompanying drawings. Obviously, the described embodiments are only a part of the embodiments of the present disclosure. Based on the embodiments in the present disclosure, all other embodiments obtained by one of ordinary skill in the art without making creative labor shall fall within the scope of protection of the present disclosure.

Referring to FIGS. 1-5, a first embodiment provided by the present disclosure is described below.

A core package includes N cores 1, N+1 hollow-square-shaped thin plates 2 and two substrates 3, and the cross-sectional area of the hollow-square-shaped thin plate 2 is greater than that of the core 1. The N+1 hollow-square-shaped thin plates 2 and the N cores 1 are stacked alternately to form a semi-finished core package, anode portions of adjacent two cores 1 are electrically connected, and cathode portions of adjacent two cores 1 are electrically connected. When stacking the hollow-square-shaped thin plates 2 and the cores 1, the space where the hollow-square-shaped thin plate 2 is not in contact with the core 1 is filled with an insulating adhesive.

Each of opposite two ends of the substrate 3 is provided with a leading-out portion 4, and the two leading-out portions 4 are symmetrically arranged. The two substrates 3 are respectively adhered to the opposite two sides of the semi-finished core package, and the leading-out portions 4 at two ends of the substrate 3 are electrically connected with the anode portion and the cathode portion of the core 1, respectively.

Specifically, opposite two ends of the hollow-square-shaped thin plate 2 are respectively an anode plate 21 and a cathode plate 22, and the anode plate 21 and the cathode plate 22 are connected through two side plates. The anode plate 21 and the anode portion of the core 1 are each penetrated with a through hole 23. When stacking the hollow-square-shaped plates 2 and the cores 1, the through holes 23 are aligned and communicated with each other, and are filled with a conductive silver paste.

A U-shaped copper foil 24 is provided an outside of the cathode plate 22, with an opening far away from the anode plate 21. When stacking the hollow-square-shaped thin plates 2 and the cores 1, the upper side and the lower side of the U-shaped copper foil 24 are respectively in contact and electrically connected with cathode portions of adjacent two cores 1.

From the above description, it can be seen that cathode portions of cores are connected in parallel through the U-shaped copper foil preset on the surface of the cathode plate of adjacent hollow-square-shaped thin plates, and the area of the two adjacent hollow-square-shaped thin plates that is not covered by the cathode portion of the core is sealed by insulating adhesive to prevent the resin encapsulation material from entering the core package from interlayers between cathode portions of the cores, so as to avoid an increase in leakage current and equivalent series resistance (ESR).

Specifically, one end of the anode plate 21 close to the cathode plate 22 is flush with the end of the separating adhesive of the core close to the cathode portion of the core 1. The length of the anode plate 21 is 100%-120% of the total length of the anode portion of the core 1 and the separating adhesive, and the width of the anode plate 21 is 120%-150% of the width of the core 1.

The length of the portion of the cathode portion of each core 1 that is sandwiched by cathode plates of two hollow-square-shaped thin plates 2 is 20%-50% of the length of the cathode portion. The width of the cathode plate 22 is 60%-80% of the width of the core 1.

The total length of the hollow portion in the middle of the hollow-square-shaped thin plate 2 and the cathode plate 22 is 110%-120% of the length of the cathode portion of the core 1. The width of the hollow-square-shaped thin plate 2 is 120%-150% of the width of the core 1.

From the above description, it can be seen that the length and width of the anode plate are set in the above ranges, so that after the cores and the hollow-square-shaped thin plates are stacked, there is still enough space between the anode plate and the anode portion of the core to fill the insulating adhesive, thereby ensuring the sealing effect of the anode portion of the core. Moreover, the length and width of the cathode plate and the hollow portion of the hollow-square-shaped thin plate are set in the above ranges, which can ensure the contact area between the cathode plate and the cathode portion of the core, and provide an enough space to fill the insulating adhesive between the hollow-square-shaped thin plate and the cathode portion of the core after stacking, so as to ensure the sealing effect of the cathode portion of the core.

Specifically, the leading-out portion 4 includes a tongue portion 41, a connection portion 42 and a pin 43. The tongue portion 41 and the pin 43 are arranged in parallel respectively on opposite two surfaces of the substrate 3, and the tongue portion 41 is electrically connected with the semi-finished core package. The connection portion 42 penetrates through the substrate 3, and opposite two ends of the connection portion 42 are respectively perpendicularly and electrically connected with the tongue portion 41 and the pin 43.

Specifically, a side of the substrate 3 far away from the semi-finished core package is provided with a rectangular protrusion 31. The length and the width of the rectangular protrusion 31 are 80%-90% of the length and width of the substrate 3, respectively. The height of the rectangular protrusion 31 is 0.3-0.5 mm. The tongue portion 41 is arranged on a side of the substrate 3 without the rectangular protrusion 31, and one end of the tongue portion 41 is flush with an end of the substrate 3. The pin 43 is horizontally arranged on a surface of the rectangular protrusion 31, and one end of the pin 43 is flush with an end of the rectangular protrusion 31.

From the above description, it can be seen that the rectangular protrusion is provided on one side of the substrate so that the outer surface of the substrate can form a step structure for wrapped by the encapsulation resin. This can improve the bonding firmness among the resin, the semi-finished core package and the substrate, and also can prolong the entering channel for external water vapor, thereby improving the moisture resistance of the capacitor.

Specifically, the distance between edges of two tongue portions 41 close to each other on the same substrate 3 is 40%-70% of the length of the substrate 3, and the distance between edges of two pins 43 close to each other on the same substrate 3 is 40%-60% of the length of the rectangular protrusion 31 of the substrate 3.

From the above description, it can be seen that the distance between the tongue portions is set in the above range. It can prevent the conduction of the positive electrode and the negative electrode during the bonding between the semi-finished core package and the substrate, thereby preventing the short circuit of the capacitor. The distance between the pins is set within the above range. It can prevent the conduction of the positive electrode and the negative electrode when soldering the capacitor on a client, thereby preventing the short circuit of the capacitor.

Figure 6:
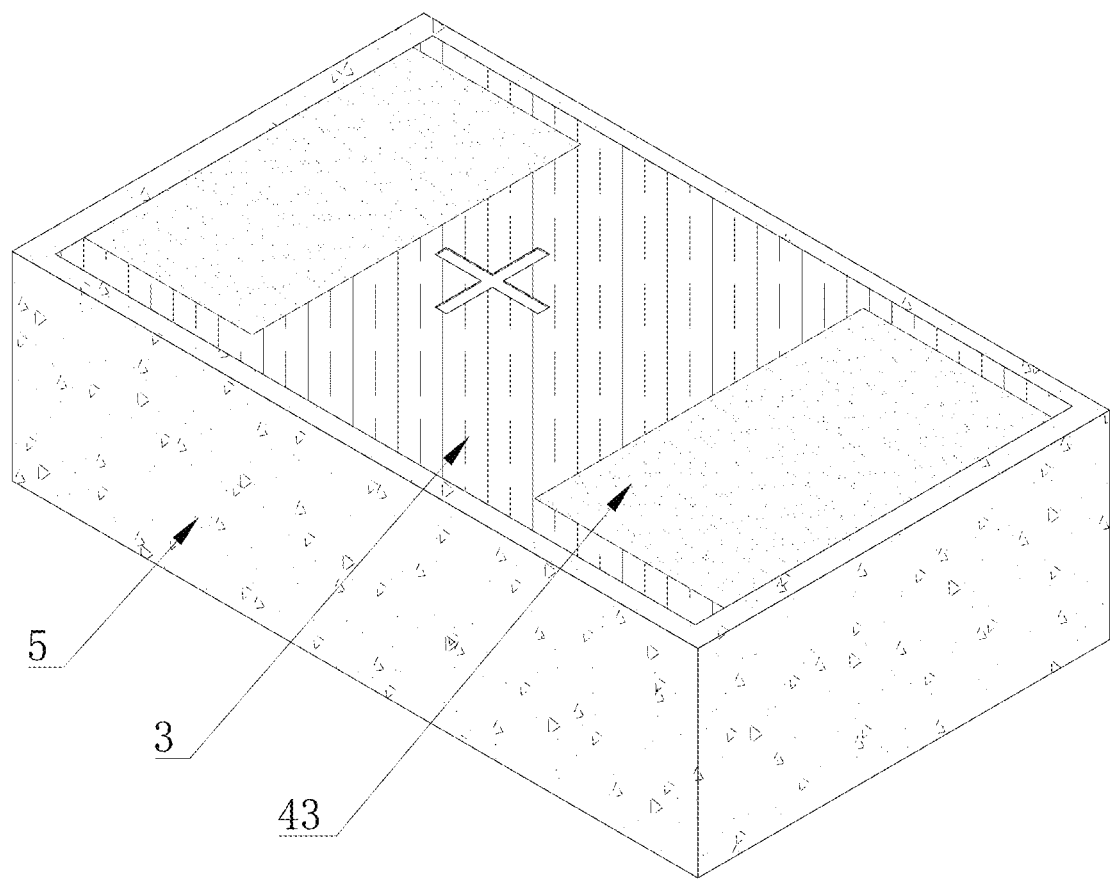
FIG. 6 is a structural diagram of a solid aluminum electrolytic capacitor according to an embodiment of the present disclosure.
Figure 7:
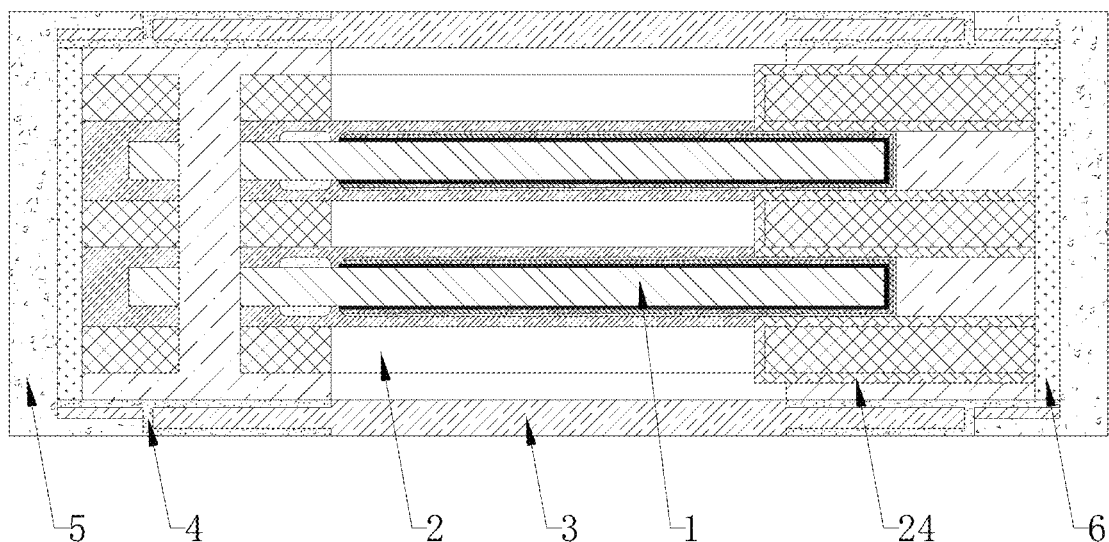
FIG. 7 is a cross-sectional view of the solid aluminum electrolytic capacitor according to an embodiment of the present disclosure.

Referring to FIGS. 6-7, a second embodiment provided by the present disclosure is described below.

A double-substrate multilayer solid aluminum electrolytic capacitor includes a resin shell 5, a waterproof coating 6, and a core package. The waterproof coating 6 is coated on four sides of the core package. The resin shell 5 wraps the waterproof coating 6 and the part of the substrate 3 of the core package that removes the rectangular protrusion 31. Four sides of the rectangular protrusion 31 of the substrate 3 are wrapped inside the resin shell 5, and the surface of the rectangular protrusion 31 provided with the pin 43 is exposed out of the resin shell 5.

From the above description, it can be seen that during the encapsulation of the capacitor, the waterproof coating is prepared in advance on the surrounding surface of the core package followed by encapsulation for protection, which can not only improve the moisture resistance of the core package but also avoid the damage caused by the direct contact of the resin with the core in the conventional structure. Moreover, the leading-out portion is preset in the hollow-square-shaped thin plate and the substrate to avoid the pin bending and forming process during the preparation of the capacitor, which prevents the leakage current increases due to the forming process, and thus improves the industrialization yield. In the meanwhile, the double-substrate encapsulation leading out design is adopted to render the front side and the back side of the pin structure symmetrical with each other, so that there is no need to distinguish between the front side and the back side of the pin when soldered on the client board.

Figure 8:
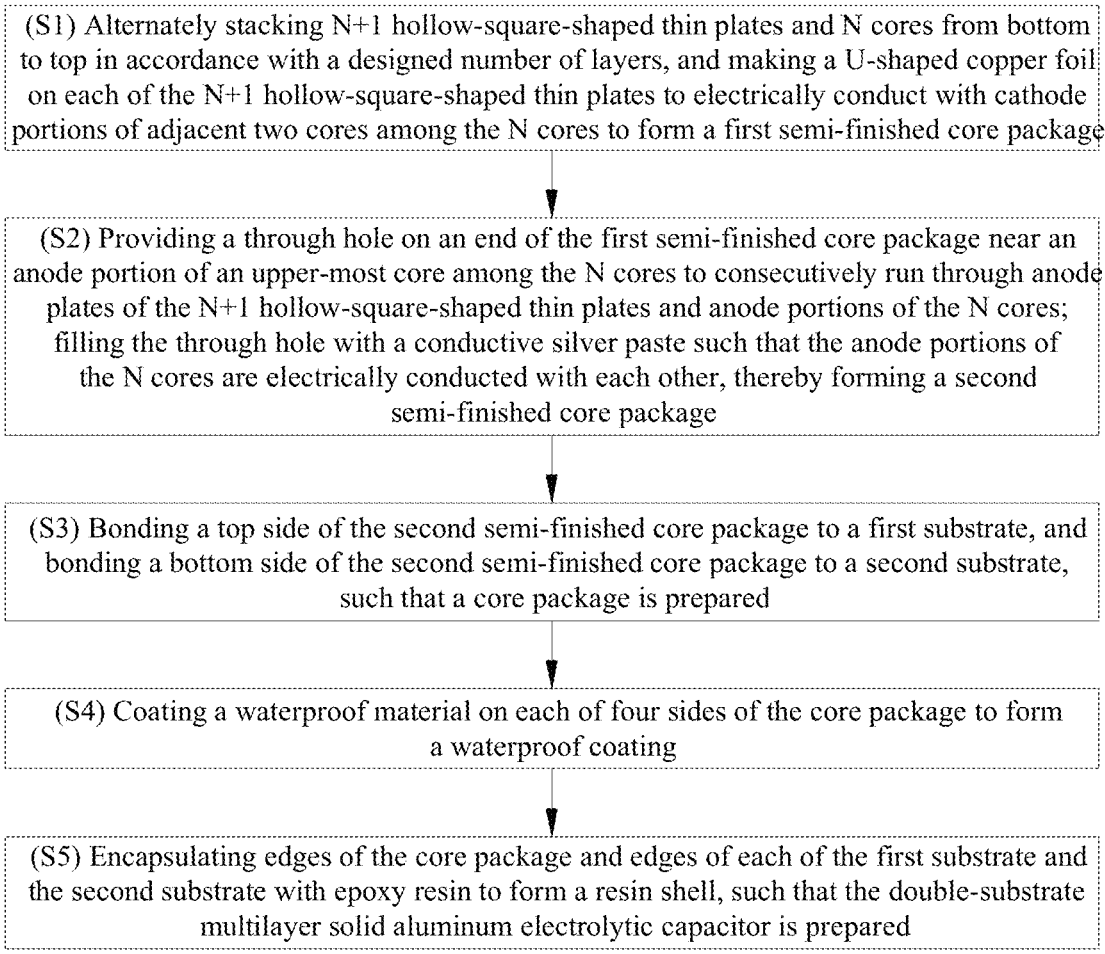
FIG. 8 is a flow chart of a method for preparing the solid aluminum electrolytic capacitor according to an embodiment of the present disclosure.

Referring to FIG. 8, a third embodiment of the present disclosure provides a method for preparing a double-substrate multilayer solid aluminum electrolytic capacitor, which includes the following steps.

(S1) In accordance with the designed number of layers, N+1 hollow-square-shaped thin plates 2 and N cores 1 are alternately stacked from bottom to top, and the U-shaped copper foil 24 on the hollow-square-shaped thin plate 2 is electrically conduct with the cathode portions of adjacent two cores 1 to form a first semi-finished core package.

(S2) An end of the first semi-finished core package near the anode portion of the core 1 is provided with a through hole 23 consecutively running through anode plates 21 of the N+1 hollow-square-shaped thin plates 2 and anode portions of the N cores 1. The through hole 23 is filled with a conductive silver paste such that the anode portions of the N cores 1 are electrically conducted with each other, thereby forming a second semi-finished core package.

(S3) A top side of the second semi-finished core package and a bottom side of the second semi-finished core package are each bonded to an external substrate 3, to obtain a core package.

(S4) Four sides of the core package are each coated with a waterproof material to form a waterproof coating 6.

(S5) Edges of the core package and edges of the substrate 3 are encapsulated with epoxy resin to form a resin shell 5, such that a double-substrate multilayer solid aluminum electrolytic capacitor is prepared.

Specifically, in step (S1), the N cores 1 and the N+1 hollow-square-shaped thin plates 2 are stacked through the following steps.

(S11) An insulating adhesive is coated on an anode plate 21 on a side of a first hollow-square-shaped thin plate 2, and a conductive silver adhesive is coated on a U-shaped copper foil 24 on a cathode plate 22 on the same side of the first hollow-square-shaped thin plate 2.

(S12) A lower surface of a first core 1 is bonded with the first hollow-square-shaped thin plate 2, so that an anode portion of the first core 1 and a separating adhesive of the first core 1 are bonded to the anode plate 21 of the first hollow-square-shaped thin plate 2, and an end of the anode plate 21 of the first hollow-square-shaped thin plate 2 close to the cathode plate 22 of the first hollow-square-shaped thin plate 2 is flush with an end of the separating adhesive close to a cathode portion of the first core 1. In the meanwhile, the cathode portion of the first core 1 is bonded to and electrically conductive to the U-shaped copper foil 24 on the cathode plate 22 of the first hollow-square-shaped thin plate 2. An insulating adhesive is coated on the area of two sides of the first hollow-square-shaped thin plate 2 that is not covered by the first core 1.

(S13) The insulating adhesive and the conductive silver adhesive are applied to a first side of a second hollow-square-shaped thin plate 2 in the manner of step (S11), and then the first side of the second hollow-square-shaped thin plate 2 coated with the insulating adhesive and the conductive silver adhesive is bonded to an upper surface of the first core 1 in the manner of step (S12), where a width of a region that is clamped by two side plates of adjacent two hollow-square-shaped thin plates in a first end of the cathode portion of the first core is equal to a width of a region that is clamped by two side plates of adjacent two hollow-square-shaped thin plates in a second end opposite to the first end of the cathode portion of the first core to complete the stacking of the first core.

(S14) The insulating adhesive and the conductive silver adhesive are applied to a second side of the second hollow-square-shaped thin plate 2 in the manner of step (S11). A lower surface of a second core 1 is bonded to the second hollow-square-shaped thin plate 2 in the manner of step (S12). The insulating adhesive is coated on the area of two side plates of the second hollow-square-shaped thin plate 2 that is not covered by the second core 1.

(S15) The insulating adhesive and the conductive silver adhesive are applied to a first side of a third hollow-square-shaped thin plate 2 in the manner of step (S11), and the first side of the third hollow-square-shaped thin plate 2 is bonded to the upper surface of the second core 1 in the manner of step (S12) to complete the stacking of the second core 1.

(S16) Steps (S14)-(S15) are repeated to continuously complete the stacking of $3^{rd}$-$N^{th}$ cores 1 to obtain a first semi-finished core package.

Specifically, step (S3) includes the following steps. A side of a first substrate 3 provided with a tongue portion 41 is opposite to a side of a second substrate 3 provided with a tongue portion 41, and the second semi-finished core package is sandwiched between the first substrate 3 and the second substrate 3. Anode plates 21 and U-shaped copper foils 24 of hollow-square-shaped thin plates 2 on two sides of the semi-finished core package are bonded with the tongue portions 41 through the conductive silver adhesive.

Embodiment 1

Referring to FIGS. 1-5, a first embodiment provided by the present disclosure is described below.

A core package includes two cores 1, three hollow-square-shaped thin plates 2 and two substrates 3, and the cross-sectional area of the hollow-square-shaped thin plate 2 is greater than that of the core 1. Opposite two ends of each hollow-square-shaped thin plate 2 are respectively an anode plate 21 and a cathode plate 22, and the anode plate 21 and the cathode plate 22 are connected through two side plates. The length of the anode plate 21 is 110% of the total length of the anode portion of the core 1 and the separating adhesive, and the width of the anode plate 21 is 135% of the width of the core 1. The length of the cathode plate 22 is 50% of the length of the cathode portion of the core 1, and the width of the cathode plate 22 is 70% of the width of the core 1. The total length of the hollow portion in the middle of the hollow-square-shaped thin plate 2 and the cathode plate 22 is 115% of the length of the cathode portion of the core 1. The width of the hollow-square-shaped thin plate 2 is 135% of the width of the core 1.

The three hollow-square-shaped thin plates 2 and the two cores 1 are stacked alternately to form a semi-finished core package, and anode portions of the two cores 1 are electrically connected as follows. The anode plate 21 and the anode portion of the core 1 are each provided with a through hole 23 that is filled with a conductive silver paste, and the five through holes are aligned and communicated to form the electrical connection. An end of the anode plate 21 close to the cathode plate 22 is flush with an end of the separating adhesive close to the cathode portion of the core.

When stacking the three hollow-square-shaped thin plates 2 and the two cores 1, cathode portions of adjacent two cores are electrically connected as follows. A U-shaped copper foil 24 is provided an outside of the cathode plate 22, with an opening far away from the anode plate 21. When stacking the hollow-square-shaped thin plates 2 and the cores 1, the upper side and the lower side of the U-shaped copper foil 24 are respectively in contact and electrically connected with cathode portions of adjacent two cores 1.

When stacking the hollow-square-shaped thin plates 2 and the cores 1, the length of the region on the cathode portion of each core 1 that is sandwiched by cathode plates of adjacent two hollow-square-shaped thin plates 2 is 35% of the length of the cathode portion. A width of a region that is clamped by two side plates of adjacent two hollow-square-shaped thin plates 2 in a first end of the cathode portion of each core 1 is equal to a width of a region that is clamped by two side plates of adjacent two hollow-square-shaped thin plates 2 in a second end opposite to the first end of the cathode portion of each core 1.

When stacking the hollow-square-shaped thin plates 2 and the cores 1, the space where the hollow-square-shaped thin plate 2 is not in contact with the core 1 is filled with an insulating adhesive.

Each of opposite two ends of the substrate 3 is provided with a leading-out portion 4, and the two leading-out portions 4 are symmetrically arranged. The two substrates 3 are respectively adhered to opposite two sides of the semi-finished core package, and the leading-out portions 4 at two ends of the substrate 3 are electrically connected with the conductive silver paste on the anode portion and the U-shaped copper foil on the cathode portion of the core 1, respectively. The leading-out portion 4 includes a tongue portion 41, a connection portion 42 and a pin 43. The tongue portion 41 and the pin 43 are arranged in parallel respectively on opposite two surfaces of the substrate 3, and the tongue portion 41 is electrically connected with the semi-finished core package. The connection portion 42 penetrates through the substrate 3, and opposite two ends of the connection portion 42 are respectively perpendicularly and electrically connected with the tongue portion 41 and the pin 43.

In this embodiment, a side of the substrate 3 far away from the semi-finished core package is provided with a rectangular protrusion 31. The length and the width of the rectangular protrusion 31 are 85% of the length and width of the substrate 3, respectively. The height of the rectangular protrusion 31 is 0.4 mm. The tongue portion 41 is arranged on a side of the substrate 3 without the rectangular protrusion 31, and one end of the tongue portion 41 is flush with an end of the substrate 3. The pin 43 is horizontally arranged on a surface of the rectangular protrusion 31, and one end of the pin 43 is flush with an end of the rectangular protrusion 31.

The distance between edges of two tongue portions 41 close to each other on the same substrate 3 is 55% of the length of the substrate 3, and the distance between edges of two pins 43 close to each other on the same substrate 3 is 50% of the length of the rectangular protrusion 31 of the substrate 3. The width of the tongue portion 41 is 90% of the width of the substrate 3, and the width of the pin 43 is 95% of the width of the rectangular projection 31.

In this embodiment, the hollow-square-shaped thin plate 2 is made of a polymer insulating material, preferably, a polyimide (PI) film.

In this embodiment, the substrate 3 is made of an insulating material, preferably, epoxy laminated glass cloth sheet (FR-4).

In this embodiment, the leading-out portion 4 is made of copper and a copper alloy.

In this embodiment, the surface of the pin 43 away from the rectangular projection 31 is provided with a tin layer.

Embodiment 2

Referring to FIGS. 1-7, a second embodiment provided by the present disclosure is described below.

A double-substrate multilayer solid aluminum electrolytic capacitor includes a resin shell 5, a waterproof coating 6, and a core package of Embodiment 1. The waterproof coating 6 is coated on four sides of the core package. The resin shell 5 wraps the waterproof coating 6 and the part of the substrate 3 of the core package that removes the rectangular protrusion 31. Four sides of the rectangular protrusion 31 of the substrate 3 are wrapped inside the resin shell 5, and the surface of the rectangular protrusion 31 provided with the pin 43 is exposed out of the resin shell 5.

In this embodiment, the waterproof coating 6 is made of one of polyvinyl alcohol, polyurethane, polyacrylate, polyvinyl acetate and silicone rubber, preferably silicone rubber.

Embodiment 3

Referring to FIGS. 1-8, a third embodiment provided by the present disclosure is described below.

A method for preparing the double-substrate multilayer solid aluminum electrolytic capacitor of Embodiment 2, which includes the following steps.

(S1) In accordance with the designed number of layers, three hollow-square-shaped thin plates 2 and two cores 1 are alternately stacked from bottom to top, and the U-shaped copper foil 24 on the hollow-square-shaped thin plate 2 is electrically conduct with the cathode portions of adjacent two cores 1 to form the first semi-finished core package. Specifically, the three hollow-square-shaped thin plates 2 and the two cores 1 are stacked through the following steps.

(S11) An insulating adhesive is coated on an anode plate 21 on a side of a first hollow-square-shaped thin plate 2, and a conductive silver adhesive is coated on a U-shaped copper foil 24 on a cathode plate 22 on the same side of the first hollow-square-shaped thin plate 2.

(S12) A lower surface of a first core 1 is bonded to the first hollow-square-shaped thin plate 2, so that an anode portion of the first core 1 and a separating adhesive of the first core 1 are bonded to the anode plate 21 of the first hollow-square-shaped thin plate 2, and an end of the anode plate 21 of the first hollow-square-shaped thin plate 2 close to the cathode plate 22 is flush with an end of the separating adhesive close to a cathode portion of the first core 1. In the meanwhile, the cathode portion of the first core 1 is bonded to and electrically conductive to the U-shaped copper foil 24 on the cathode plate 22 of the first hollow-square-shaped thin plate 2. An insulating adhesive is coated on the area of two sides of the first hollow-square-shaped thin plate 2 that is not covered by the first core 1.

(S13) The insulating adhesive and the conductive silver adhesive are applied to a first side of a second hollow-square-shaped thin plate 2 in the manner of step (S11), and then the first side of the second hollow-square-shaped thin plate 2 coated with the insulating adhesive and the conductive silver adhesive is bonded to an upper surface of the first core 1 in the manner of step (S12), where a width of a region that is clamped by two side plates of adjacent two hollow-square-shaped thin plates 2 in a first end of the cathode portion of the first core 1 is equal to a width of a region that is clamped by two side plates of adjacent two hollow-square-shaped thin plates 2 in a second end opposite to the first end of the cathode portion of the first core 1 to complete the stacking of the first core 1.

(S14) The insulating adhesive and the conductive silver adhesive are applied to a second side of the second hollow-square-shaped thin plate 2 in the manner of step (S11). A lower surface of a second core 1 is bonded to the second hollow-square-shaped thin plate 2 in the manner of step (S12). The insulating adhesive is coated on the area of two side plates of the second hollow-square-shaped thin plate 2 that is not covered by the second core 1.

(S15) The insulating adhesive and the conductive silver adhesive are applied to a first side of a third hollow-square-shaped thin plate 2 in the manner of step (S11), and the first side of the third hollow-square-shaped thin plate 2 is bonded to the upper surface of the second core 1 in the manner of step (S12) to complete the stacking of the second core 1, thereby forming a first semi-finished core package.

(S2) An end of the first semi-finished core package near the anode portion of the core 1 is provided with a through hole 23 consecutively running through anode plates 21 of the three hollow-square-shaped thin plates 2 and anode portions of the two cores 1. The through hole 23 is filled with a conductive silver paste such that the anode portions of the two cores 1 are electrically conducted with each other, thereby forming a second semi-finished core package.

(S3) A top side of the second semi-finished core package and a bottom side of the second semi-finished core package are each bonded to an external substrate 3 to obtain a core package. Specifically, a side of a first substrate 3 provided with a tongue portion 41 is opposite to a side of a second substrate 3 provided with a tongue portion 41, and the second semi-finished core package is sandwiched between the first substrate 3 and the second substrate 3. Anode plates 21 and U-shaped copper foils 24 of hollow-square-shaped thin plates 2 on two sides of the semi-finished core package are bonded with the tongue portions 41 through the conductive silver adhesive.

(S4) Four sides of the core package are each coated with a waterproof material to form a waterproof coating 6.

(S5) Edges of the core package and edges of the substrate 3 are encapsulated with epoxy resin to form a resin shell 5, such that a double-substrate multilayer solid aluminum electrolytic capacitor is prepared. Specifically, the resin shell 5 wraps the waterproof coating 6 and the part of the substrate 3 of the core package that removes the rectangular protrusion 31. Four sides of the rectangular protrusion 31 of the substrate 3 are wrapped inside the resin shell 5, and the surface of the rectangular protrusion 31 provided with the pin 43 is exposed out of the resin shell 5.

In this embodiment, the core 1 is prepared through the following steps. A formed foil is punched and cut into a strip. A separating adhesive is applied to the strip to divide an anode region (anode portion) and a cathode region. A conductive polymer layer, a conductive carbon paste layer, and a conductive silver paste layer are successively prepared on a surface of the cathode region to form a cathode portion, such that the core is prepared.

Unlike the leading-out way of the traditional planar metal lead frame, the present disclosure adopts a core package structure, in which the hollow-square-shaped thin plates and the cores are alternately stacked. Cathode portions of the cores are in parallel electrical conduction through the U-shaped copper foil pre-set on the surface of hollow-square-shaped thin plates adjacent to the core. The uppermost hollow-square-shaped thin plate and the lower-most hollow-square-shaped thin plate are each connected with an external substrate provided with a leading-out portion to complete the leading out of the cathode. The peripheral size of the hollow-square-shaped thin plate is larger than the size of the core, and after stacking with the core, the space not occupied by the core is sealed through an insulating adhesive, so as to realize the support and protection of the core, and prevent delamination and the deterioration of the electrical properties caused by entering of resin from the interlayer of the cores.

In the present disclosure, two substrates pre-provided with a leading-out component are used for encapsulation to form a core package, such that the positive pole and the negative pole of the core package can be led out while protecting the upper and lower surfaces of the core package. Moreover, the waterproof coating is applied to the peripheral sides of the core package, and then the resin encapsulating material is coated on the peripheral sides of the core package for encapsulation and protection. Such structure can enhance the resistance to humidity of the core package, and avoid damage to the core caused by direct contact with the resin in the traditional structure. Step structures are provided on the peripheral sides of substrate for being encapsulated by the resin. It improves the bonding of resin with the core package and the substrate, and prolongs the intrusion channel of the external water vapor, which is conducive to improving the humidity resistance of the capacitor.

In the leading-out structure of the traditional planar metal lead frame, the lead exposed out of the resin shell is bent and formed to form the external terminal, which causes mechanical impact on the core package. In the present disclosure, the leading-out structures are pre-set in the hollow-square-shaped thin plate and the substrate, which can omit the bending and formation processes of pins, thereby preventing the increase in leakage current caused by the formation process and thus enhance the industrialization yield.

Although the present disclosure has been described in detail above, those skilled in the art can still make various modifications to the embodiments provided herein without departing from the principle and spirit of the present disclosure. The scope of the present disclosure is defined by the appended claims.

What is claimed is:

1. A core package, comprising:
   N cores;
   N+1 hollow-square-shaped thin plates;
   a first substrate; and
   a second substrate;
   wherein a cross-sectional area of each of the N+1 hollow-square-shaped thin plate is larger than that of each of the N cores; the N+1 hollow-square-shaped thin plates and the N cores are stacked alternately to form a semi-finished core package; anode portions of adjacent two cores are electrically connected, and cathode portions of adjacent two cores are electrically connected; when stacking the N+1 hollow-square-shaped thin plates and the N cores, a space where the N+1 hollow-square-shaped thin plates are not in contact with the N cores is filled with an insulating adhesive; and
   a first end of each of the first substrate and the second substrate is provided with a first leading-out portion, a second end of each of the first substrate and the second substrate opposite to the first end is provided with a second leading-out portion, and the first leading-out portion and the second leading-out portion are symmetrically arranged; the first substrate is bonded to a first side of the semi-finished core package, and the second substrate is bonded to a second side of the semi-finished core package, wherein the first side of the semi-finished core package is opposite to the second side of the semi-finished core package; and the first leading-out portion and the second leading-out portion of the first substrate are respectively electrically connected with an anode portion and a cathode portion of an upper-most core among the N cores, and the first leading-out portion and the second leading-out portion of the second substrate are respectively electrically connected with an anode portion and a cathode portion of a lower-most core among the N cores.

2. The core package of claim 1, wherein opposite two ends of each of the N+1 hollow-square-shaped thin plates are respectively an anode plate and a cathode plate, and the anode plate and the cathode plate are connected through two side plates; the anode plate and an anode portion of each of the N cores are each penetrated with a through hole; and when stacking the N+1 hollow-square-shaped thin plates and the N cores, through holes are aligned and communicated with each other, and are filled with a conductive silver paste; and a U-shaped copper foil is provided an outside of the cathode plate, with an opening far away from the anode plate; and when stacking the N+1 hollow-square-shaped thin plates and the N cores, an upper side and a lower side of the U-shaped copper foil are respectively in contact and electrically connected with cathode portions of adjacent two cores.

3. The core package of claim 2, wherein one end of the anode plate close to the cathode plate is flush with an end of a separating adhesive of each of the N cores close to the cathode portion of each of the N cores; a length of the anode plate is 100%-120% of a total length of the anode portion and the separating adhesive of each of the N cores, and a width of the anode plate is 120%-150% of a width of each of the N cores;

a length of a portion of the cathode portion of each of the N cores that is sandwiched by cathode plates of adjacent two hollow-square-shaped thin plates is 20%-50% of a length of the cathode portion of each of the N cores; and a width of the cathode plate is 60%-80% of a width of each of the N cores; and a total length of a hollow portion in a middle of each of the N+1 hollow-square-shaped thin plates and the cathode plate is 110%-120% of the length of the cathode portion of each of the N cores; and a width of each of the N+1 hollow-square-shaped thin plates is 120%-150% of the width of each of the N cores.

4. The core package of claim 1, wherein each of the first leading-out portion and the second leading-out portion comprises a tongue portion, a connection portion and a pin; the tongue portion and the pin are arranged in parallel respectively on opposite two surfaces of each of the first substrate and the second substrate, and the tongue portion is electrically connected with the semi-finished core package; the connection portion is configured to penetrate through each of the first substrate and the second substrate, and opposite two ends of the connection portion are respectively perpendicularly and electrically connected with the tongue portion and the pin.

5. The core package of claim 4, wherein a side of each of the first substrate and the second substrate away from the semi-finished core package is provided with a rectangular protrusion; a length of the rectangular protrusion is 80%-90% of a length of each of the first substrate and the second substrate, and a width of the rectangular protrusion is 80%-90% of a width of each of the first substrate and the second substrate; a height of the rectangular protrusion is 0.3-0.5 mm; the tongue portion is arranged on a side of each of the first substrate and the second substrate without the rectangular protrusion, and one end of the tongue portion is flush with an end of each of the first substrate and the second substrate; and the pin is horizontally arranged on a surface of the rectangular protrusion, and one end of the pin is flush with an end of the rectangular protrusion.

6. The core package of claim 5, wherein a distance between edges of two tongue portions close to each other on the same substrate is 40%-70% of the length of each of the first substrate and the second substrate; and a distance between edges of two pins close to each other on the same substrate is 40%-60% of the length of the rectangular protrusion of each of the first substrate and the second substrate.

7. A double-substrate multilayer solid aluminum electrolytic capacitor, comprising:

a resin shell;
a waterproof coating; and
the core package of claim 1;
wherein the waterproof coating is coated on four sides of the core package; the resin shell is configured to wrap the waterproof coating and a part of each of the first substrate and the second substrate of the core package that removes the rectangular protrusion; and four sides of the rectangular protrusion are wrapped inside the resin shell and a surface of the rectangular protrusion provided with the pin is exposed out of the resin shell.

8. A method for preparing a double-substrate multilayer solid aluminum electrolytic capacitor, comprising:

(S1) alternately stacking N+1 hollow-square-shaped thin plates and N cores from bottom to top in accordance with a designed number of layers, and making a U-shaped copper foil on each of the N+1 hollow-square-shaped thin plates to electrically conduct with cathode portions of adjacent two cores among the N cores to form a first semi-finished core package;

(S2) providing a through hole on an end of the first semi-finished core package near an anode portion of an upper-most core among the N cores to consecutively run through anode plates of the N+1 hollow-square-shaped thin plates and anode portions of the N cores; filling the through hole with a conductive silver paste such that the anode portions of the N cores are electrically conducted with each other, thereby forming a second semi-finished core package;

(S3) bonding a top side of the second semi-finished core package to a first substrate, and bonding a bottom side of the second semi-finished core package to a second substrate, such that a core package is prepared;

(S4) coating a waterproof material on each of four sides of the core package to form a waterproof coating; and (S5) encapsulating edges of the core package and edges of each of the first substrate and the second substrate with epoxy resin to form a resin shell, such that the double-substrate multilayer solid aluminum electrolytic capacitor is prepared.

9. The method of claim 8, wherein in step (S1), the N+1 hollow-square-shaped thin plates and the N cores are alternately stacked through steps of:

(S11) applying an insulating adhesive to an anode plate on a first side of a first hollow-square-shaped thin plate, and applying a conductive silver adhesive to a U-shaped copper foil on a cathode plate on the first side of the first hollow-square-shaped thin plate;

(S12) bonding a lower surface of a first core to the first hollow-square-shaped thin plate, so that an anode portion of the first core and a separating adhesive of the first core are bonded to the anode plate of the first hollow-square-shaped thin plate, and an end of the anode plate of the first hollow-square-shaped thin plate close to the cathode plate is flush with an end of the separating adhesive close to a cathode portion of the first core; bonding the cathode portion of the first core to the U-shaped copper foil on the cathode plate of the first hollow-square-shaped thin plate, such that the cathode portion of the first core electrically conductive to the U-shaped copper foil; and applying an insulating adhesive to an area of two side plates of the first hollow-square-shaped thin plate that is not covered by the first core;

(S13) applying the insulating adhesive and the conductive silver adhesive to a first side of a second hollow-square-shaped thin plate in the manner of step (S11), and then bonding the first side of the second hollow-square-shaped thin plate to an upper surface of the first core in the manner of step (S12), wherein a width of a region that is clamped by two side plates of adjacent two hollow-square-shaped thin plates in a first end of the cathode portion of the first core is equal to a width of a region that is clamped by two side plates of adjacent two hollow-square-shaped thin plates in a second end opposite to the first end of the cathode portion of the first core to complete the stacking of the first core;

(S14) applying the insulating adhesive and the conductive silver adhesive to a second side of the second hollow-square-shaped thin plate in the manner of step (S11); bonding a lower surface of a second core to the second hollow-square-shaped thin plate in the manner of step (S12); applying the insulating adhesive to an area of two side plates of the second hollow-square-shaped thin plate that is not covered by the second core;

(S15) applying the insulating adhesive and the conductive silver adhesive to a first side of a third hollow-square-shaped thin plate in the manner of step (S11), and bonding the first side of the third hollow-square-shaped thin plate to an upper surface of the second core in the manner of step (S12) to complete the stacking of the second core; and (S16) repeating steps (S14)-(S15) to continuously complete the stacking of $3^{rd}$-$N^{th}$ cores to obtain the first semi-finished core package.

10. The method of claim 8, wherein step (S3) comprises:
making a side of a first substrate provided with a tongue portion opposite to a side of a second substrate provided with a tongue portion, and arranging the second semi-finished core package between the first substrate and the second substrate; and bonding anode plates and U-shaped copper foils of an upper-most hollow-square-shaped thin plate and a lower-most hollow-square-shaped thin plate of the semi-finished core package to the tongue portion through a conductive silver adhesive.

* * * * *